(12) United States Patent
Hao et al.

(10) Patent No.: US 8,765,625 B2
(45) Date of Patent: Jul. 1, 2014

(54) ENGINE EXHAUST CATALYSTS CONTAINING COPPER-CERIA

(75) Inventors: Xianghong Hao, Foster City, CA (US); Juan Cai, Sunnyvale, CA (US)

(73) Assignee: Shubin, Inc., Los Altos, CA (US)

( * ) Notice: Subject to any disclaimer, the term of this patent is extended or adjusted under 35 U.S.C. 154(b) by 19 days.

(21) Appl. No.: 12/964,624

(22) Filed: Dec. 9, 2010

(65) Prior Publication Data

US 2011/0143921 A1  Jun. 16, 2011

Related U.S. Application Data

(60) Provisional application No. 61/285,498, filed on Dec. 10, 2009.

(51) Int. Cl.

| | | |
|---|---|---|
| B01J 21/00 | (2006.01) |
| B01J 29/00 | (2006.01) |
| B01J 23/00 | (2006.01) |
| B01J 23/02 | (2006.01) |
| B01J 23/04 | (2006.01) |
| B01J 23/42 | (2006.01) |
| B01J 23/44 | (2006.01) |
| B01J 23/56 | (2006.01) |
| B01J 23/58 | (2006.01) |
| B01J 23/70 | (2006.01) |
| B01J 23/72 | (2006.01) |

(52) U.S. Cl.
USPC ............. 502/74; 502/245; 502/262; 502/304; 502/317; 502/318; 502/330; 502/331; 502/332; 502/333; 502/334; 502/339; 502/344; 502/345; 502/346; 502/439; 502/527.12; 502/527.13

(58) Field of Classification Search
USPC .................. 502/74, 245, 262, 304, 317, 318, 502/330–334, 339, 344–346, 527.12, 502/527.13, 439; 422/170–180
See application file for complete search history.

(56) References Cited

U.S. PATENT DOCUMENTS

| 4,025,461 | A | * | 5/1977 | Croce et al. ................... 502/304 |
|---|---|---|---|---|
| 4,985,211 | A | * | 1/1991 | Akiyama et al. ............... 422/171 |
| 6,857,431 | B2 | * | 2/2005 | Deevi et al. .................... 131/334 |
| 6,913,739 | B2 | * | 7/2005 | Shore et al. .................... 423/247 |
| 7,374,729 | B2 | * | 5/2008 | Chen et al. ..................... 422/177 |
| 7,491,675 | B2 | * | 2/2009 | Deevi et al. .................... 502/345 |
| 7,501,098 | B2 | * | 3/2009 | Chen et al. ..................... 422/177 |
| 7,517,826 | B2 | * | 4/2009 | Fujdala et al. ................... 502/60 |
| 7,576,031 | B2 | * | 8/2009 | Beutel et al. ................... 502/339 |

(Continued)

FOREIGN PATENT DOCUMENTS

WO    WO 98/24535    6/1998

OTHER PUBLICATIONS

PCT Search Report and Written Opinion for International Application No. PCT/US2010/059912 dated Jul. 29, 2011.

*Primary Examiner* — Cam N. Nguyen
(74) *Attorney, Agent, or Firm* — Patterson & Sheridan, LLP

(57) ABSTRACT

An emission control catalyst includes copper-ceria to boost low temperature CO oxidation performance, generate exothermic heat during the process, and reduce HC and $NO_x$ emissions. As a result, system performance is boosted at equal catalyst cost or maintained at a reduced catalyst cost. In one embodiment, an engine exhaust catalyst includes a first washcoat layer having at least one of a platinum-based catalyst, a palladium-based catalyst, and combinations thereof; and a second washcoat layer having copper-ceria.

30 Claims, 4 Drawing Sheets

(56) References Cited

U.S. PATENT DOCUMENTS

| | | | |
|---|---|---|---|
| 7,875,250 B2 * | 1/2011 | Nunan | 422/177 |
| 7,906,449 B2 * | 3/2011 | Ando et al. | 502/66 |
| 8,220,251 B2 * | 7/2012 | Oger et al. | 60/286 |
| 2002/0061277 A1 * | 5/2002 | Ruettinger et al. | 423/654 |
| 2004/0086432 A1 | 5/2004 | LaBarge et al. | |
| 2004/0086440 A1 | 5/2004 | LaBarge et al. | |
| 2006/0062704 A1 | 3/2006 | Liu et al. | |

* cited by examiner

ENGINE EXHAUST CATALYSTS CONTAINING COPPER-CERIA

CROSS-REFERENCE TO RELATED APPLICATION(S)

This application claims the benefit of U.S. Provisional Patent Application Ser. No. 61/285,498, filed on Dec. 10, 2009, the entire contents of which are incorporated by reference herein.

BACKGROUND OF THE INVENTION

1. Field of the Invention

Embodiments of the present invention are directed to engine exhaust catalysts and more particularly to engine exhaust catalysts containing copper-ceria.

2. Description of the Related Art

Copper or copper oxide on cerium oxide, which are referred to as copper-ceria catalysts have been employed in various applications, such as total oxidation of carbon monoxide and methane, methanol, the water-gas shift reaction, and oxidation of phenol.

In U.S. Pat. No. 3,819,535, an improved catalyst for oxidation of hydrocarbons and carbon monoxide present in engine exhaust gases is disclosed where the catalyst is prepared by depositing copper oxide and ceria on an alumina support that has been stabilized against shrinkage. The improved catalyst according to U.S. Pat. No. 3,819,535 provides high activity for carbon monoxide combustion as well as sufficient activity to oxidize hydrocarbons. Other advantages that are cited in the patent include a low ignition temperature for carbon monoxide and maintaining high activity even after extended exposure to high temperatures.

In U.S. Pat. No. 4,996,180, a catalyst containing an intimate mixture of copper oxide and ceria that is suitable for oxidation or reduction of chemical feedstocks, low temperature water gas shift, methanol synthesis, and controlling engine exhaust emissions is disclosed. A key feature of this catalyst is that the weight of the copper oxide is less than the weight of the ceria. Experiments disclosed in U.S. Pat. No. 4,996,180 show inferior oxidation and reduction performance when the copper content is very high.

U.S. Pat. No. 7,220,692 shows copper-ceria applied to selective catalyst reduction (SCR). This patent teaches the addition of ceria as a stabilizing oxide to zeolite-based materials in SCR applications as a way to combat the loss of catalytic activity of the zeolite-based materials under wet conditions. According to U.S. Pat. No. 7,220,692, the addition of ceria to zeolite-based materials, in particular Cu-ZSM-5, improves hydrothermal stability of Cu-ZSM-5 so that the catalytic activity of Cu-ZSM-5 is sustained even under wet conditions.

Copper-ceria catalysts have also been employed in cigarette filters to catalyze the oxidation of carbon monoxide at low temperatures and reduce the amount of carbon monoxide in cigarette smoke. In U.S. Pat. No. 6,857,431, copper oxide nanoparticles and/or copper nanoparticles are combined with ceria nanoparticles to reduce the amount of carbon monoxide in cigarette smoke. This patent recognizes the application of such catalysts to vehicle exhaust emissions systems of automobiles and diesel engines and cold starting systems of automobile engines.

As has been recognized in the art, copper-ceria catalysts are attractive because they are cost effective relative to catalyst containing precious metals such as platinum (Pt), palladium (Pd), and the like, and are good oxidation catalysts at low temperatures. Despite these advantages, their use in automotive applications has been very limited. An investigation of most commercial emission control systems of today will reveal that copper-ceria is not employed as a catalytically active component.

SUMMARY OF THE INVENTION

Embodiments of the present invention leverage the advantages of copper-ceria catalysts by applying copper-ceria to emission control systems as a way to boost system performance at equal cost or maintain system performance at a reduced cost, relative to alternatives that are currently available.

In a first embodiment of the present invention, copper-ceria is contained in a middle layer of a three-layer engine control catalyst. In a second embodiment of the present invention, copper-ceria is contained in a bottom layer of a two-layer engine control catalyst. In a third embodiment of the present invention, copper-ceria is physically mixed with a platinum-containing catalyst and zeolites in a single layer engine control catalyst. In all of the embodiments, copper-ceria boosts low temperature carbon monoxide ("CO") oxidation performance, generates exothermic heat during the process, and reduces hydrocarbon ("HC") and nitrogen oxide ("$NO_x$") emissions during cold starts.

In another embodiment, an engine exhaust catalyst includes a first washcoat layer having a platinum-based catalyst; a second washcoat layer; a third washcoat layer includes a palladium-gold catalyst; and a copper ceria catalyst in at least one of the first, second, and third layers. In one or more of the embodiments described herein, the copper ceria is in the second washcoat layer. In one or more of the embodiments described herein, the catalyst further includes a substrate, wherein the third washcoat layer directly contacts the substrate and the second washcoat layer is disposed between the first and third washcoat layers. In one or more of the embodiments described herein, the copper ceria is included in another washcoat layer.

In another embodiment, an engine exhaust catalyst includes a first washcoat layer having at least one of a platinum-based catalyst, a palladium-based catalyst, and combinations thereof; and a second washcoat layer having copper-ceria. In one or more of the embodiments described herein, the catalyst includes a substrate, wherein the second washcoat layer directly contacts the substrate. In one or more of the embodiments described herein, the catalyst includes a third washcoat layer.

In another embodiment, an engine exhaust catalyst includes a copper ceria; a platinum-based catalyst, a palladium-based catalyst, and combinations thereof; and a zeolite. In one or more of the embodiments described herein, the zeolites include HY zeolites and ZSM5 zeolites.

In another embodiment, an engine exhaust catalyst includes a first zone having at least one of a platinum-based catalyst, a palladium-based catalyst, and combinations thereof; and a second zone having copper-ceria. In yet another embodiment, the engine exhaust catalyst further includes one or more washcoat layers having a metal catalyst. In still yet another embodiment, the engine exhaust catalyst further includes a washcoat layer having copper ceria.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Likewise, reference to "the invention" shall not be construed as a generalization of any inventive subject matter disclosed herein and shall not be considered to be an element or limitation of the appended claims except where explicitly recited in the claims.

FIGS. 1A-1D are schematic representations of different engine exhaust systems in which embodiments of the present invention may be used. The combustion process that occurs in an engine 102 produces harmful pollutants, such as CO, various hydrocarbons, particulate matter, and nitrogen oxides ($NO_x$), in an exhaust stream that is discharged through a tail pipe 108 of the exhaust system.

Figure 1A:
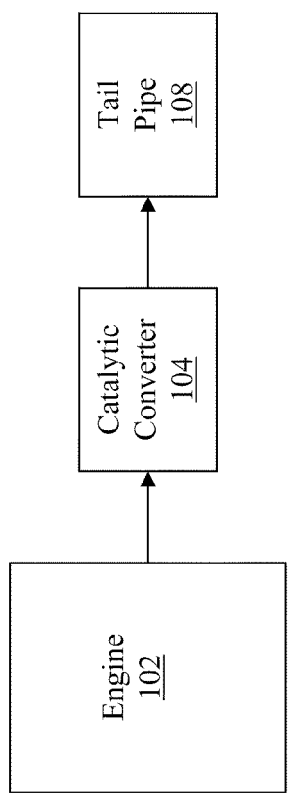
FIGS. 1A-1D are schematic representations of different engine exhaust systems in which embodiments of the present invention may be used.

In the exhaust system of FIG. 1A, the exhaust stream from an engine 102 passes through a catalytic converter 104, before it is discharged into the atmosphere (environment) through a tail pipe 108. The catalytic converter 104 contains supported catalysts coated on a monolithic substrate that treat the exhaust stream from the engine 102. The exhaust stream is treated by way of various catalytic reactions that occur within the catalytic converter 104. These reactions include the oxidation of CO to form $CO_2$, burning of hydrocarbons, and the conversion of NO to $NO_2$.

Figure 1B:
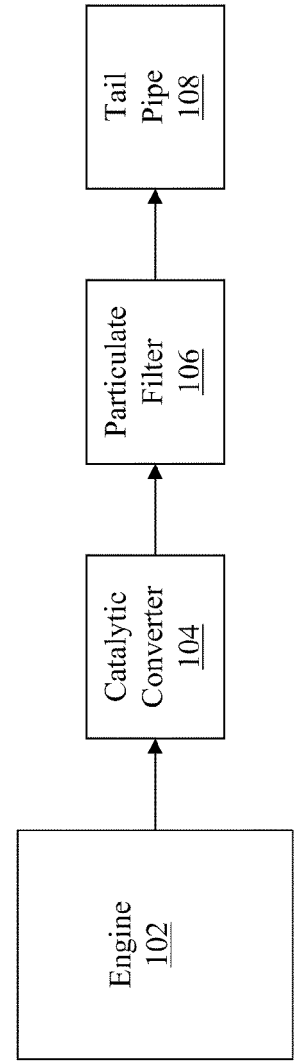

In the exhaust system of FIG. 1B, the exhaust stream from the engine 102 passes through a catalytic converter 104 and a particulate filter 106, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter.

Figure 1C:
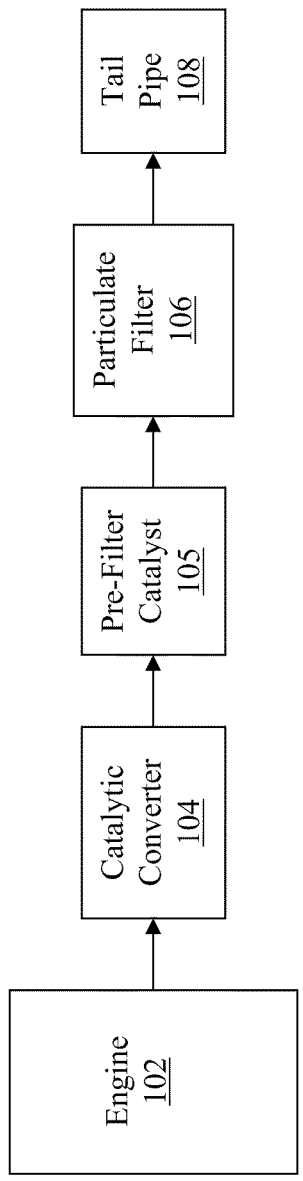

In the exhaust system of FIG. 1C, the exhaust stream from the engine 102 passes through a catalytic converter 104, a pre-filter catalyst 105 and a particulate filter 106, before it is discharged into the atmosphere through a tail pipe 108. The catalytic converter 104 operates in the same manner as in the exhaust system of FIG. 1A. The pre-filter catalyst 105 includes a monolithic substrate and supported catalysts coated on the monolithic substrate for the oxidation of NO. The particulate filter 106 traps particulate matter that is in the exhaust stream, e.g., soot, liquid hydrocarbons, generally particulates in liquid form.

Figure 1D:
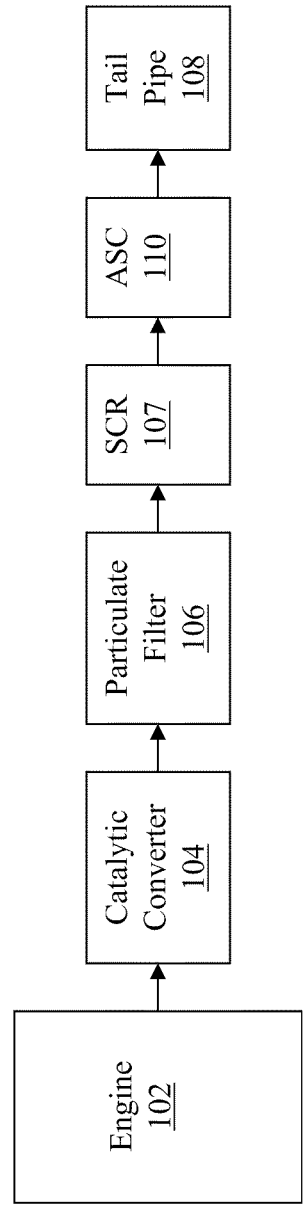

In the exhaust system of FIG. 1D, the exhaust stream passes from the engine 102 through a catalytic converter 104, a particulate filter 106, a selective catalytic reduction (SCR) unit 107 and an ammonia slip catalyst 110, before it is discharged into the atmosphere through a tail pipe 108. The catalytic converter 104 operates in the same manner as in the exhaust system of FIG. 1A. The particulate filter 106 traps particulate matter that is in the exhaust stream, e.g., soot, liquid hydrocarbons, generally particulates in liquid form. In an optional configuration, the particulate filter 106 includes a supported catalyst coated thereon for the oxidation of NO and/or to aid in combustion of particulate matter. The SCR unit 107 is provided to reduce the $NO_x$ species to $N_2$. The SCR unit 107 may be ammonia/urea based or hydrocarbon based. The ammonia slip catalyst 110 is provided to reduce the amount of ammonia emissions through the tail pipe 108. An alternative configuration places the SCR unit 107 in front of the particulate filter 106.

Alternative configurations of the exhaust system includes the provision of SCR unit 107 and the ammonia slip catalyst 110 in the exhaust system of FIG. 1A or 1C, and the provision of just the SCR unit 107, without the ammonia slip catalyst 110, in the exhaust system of FIG. 1A, 1B or 1C. As a further alternative, a $NO_x$ storage reduction (NSR) catalyst may be used in place of the SCR unit 107.

As particulates get trapped in the particulate filter within the exhaust system of FIG. 1B, 1C or 1D, it becomes less effective and regeneration of the particulate filter becomes necessary. The regeneration of the particulate filter can be either passive or active. Passive regeneration occurs automatically in the presence of $NO_2$. Thus, as the exhaust stream containing $NO_2$ passes through the particulate filter, passive regeneration occurs. During regeneration, the particulates get oxidized and $NO_2$ gets converted back to NO. In general, higher amounts of $NO_2$ improve the regeneration performance, and thus this process is commonly referred to as $NO_2$ assisted oxidation. However, too much $NO_2$ is not desirable because excess $NO_2$ is released into the atmosphere and $NO_2$ is considered to be a more harmful pollutant than NO. The $NO_2$ used for regeneration can be formed in the engine during combustion, from NO oxidation in the catalytic converter 104, from NO oxidation in the pre-filter catalyst 105, and/or from NO oxidation in a catalyzed version of the particulate filter 106.

Active regeneration is carried out by heating up the particulate filter 106 and oxidizing the particulates. At higher temperatures, $NO_2$ assistance of the particulate oxidation becomes less important. The heating of the particulate filter 106 may be carried out in various ways known in the art. One way is to employ a fuel burner which heats the particulate filter 106 to particulate combustion temperatures. Another way is to increase the temperature of the exhaust stream by modifying the engine output when the particulate filter load reaches a pre-determined level.

The present invention provides catalysts that are to be used in the catalytic converter 104 shown in FIGS. 1A-1D, or generally as catalysts in any vehicle emission control system, including as a diesel oxidation catalyst, a diesel filter catalyst, an ammonia-slip catalyst, an NSR catalyst, an SCR catalyst, or as a component of a three-way catalyst. The present invention further provides a vehicle emission control system, such as the ones shown in FIGS. 1A-1D, comprising an emission control catalyst comprising a monolith and a supported catalyst coated on the monolith.

Figure 2:
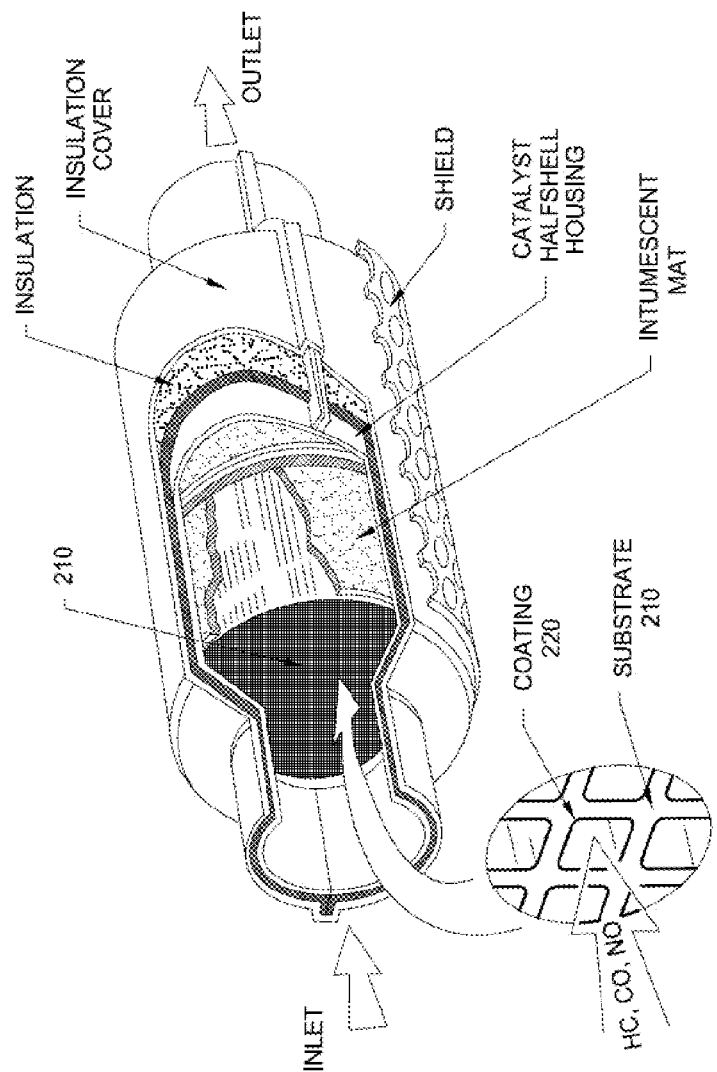
FIG. 2 is an illustration of a catalytic converter with a cut-away section that shows a substrate onto which emission control catalysts according to embodiments of the present invention are coated.

FIG. 2 is an illustration of a catalytic converter with a cut-away section that shows a substrate 210 onto which supported metal catalysts are coated. The exploded view of the substrate 210 shows that the substrate 210 has a honeycomb structure comprising a plurality of channels into which washcoats containing supported metal catalysts are flowed in slurry form so as to form coating 220 on the substrate 210.

In one embodiment of the present invention, a single layer of washcoat containing one or more supported metal catalysts is coated on substrate 210. FIGS. 3A-3D illustrate multi-layered, multi-zoned, and multi-brick embodiments of the present invention. In the embodiment of FIG. 3A, coating 220 comprises two washcoat layers 221, 223 on top of substrate 210. Washcoat layer 221 is the bottom layer that is disposed directly on top of the substrate 210. Washcoat layer 223 is the top layer that is in direct contact with the exhaust stream. Based on their positions relative to the exhaust stream, washcoat layer 223 encounters the exhaust stream before washcoat layer 221.

Figure 3B:
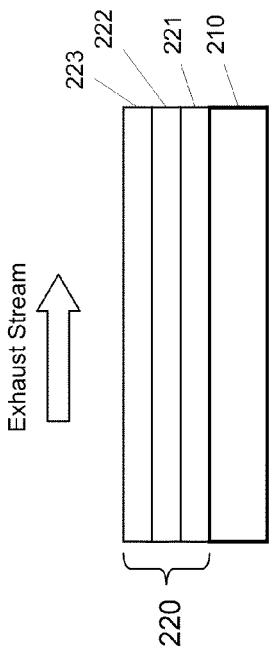
FIGS. 3A-3D illustrate different configurations of a substrate for an emission control catalyst.

In the embodiment of FIG. 3B, coating 220 comprises three washcoat layers 221, 222, 223 on top of substrate 210. Washcoat layer 221 is the bottom layer that is disposed directly on top of the substrate 210. Washcoat layer 223 is the top layer that is in direct contact with the exhaust stream. Washcoat layer 222 is the middle layer that is disposed in between washcoat layers 221, 223. The middle layer is also referred to as a buffer layer. Based on their positions relative to the exhaust stream, washcoat layer 223 encounters the exhaust stream before washcoat layers 221, 222, and washcoat layer 222 encounters the exhaust stream before washcoat layer 221.

Figure 3D:
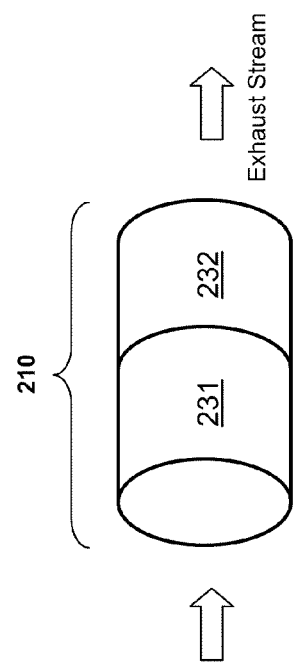
Figure 3A:
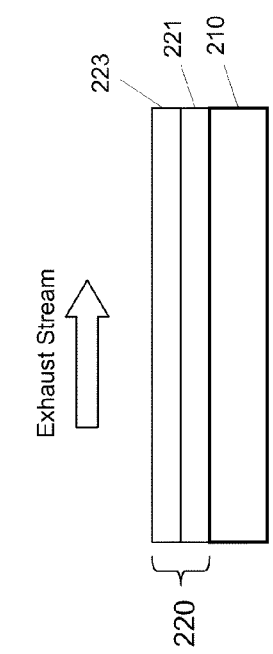
Figure 3C:
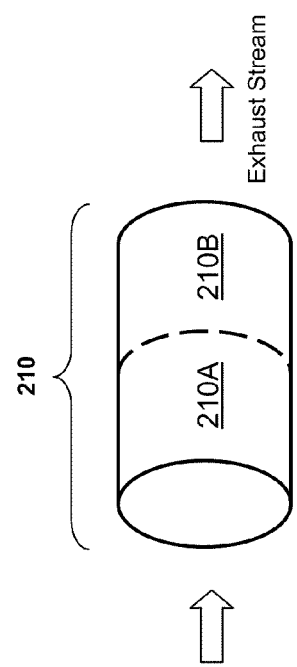

In the embodiment of FIG. 3C, the substrate 210 is a single monolith that has two coating zones 210A, 210B. A first washcoat is coated onto a first zone 210A and a second washcoat is coated onto a second zone 210B. In the embodiment of FIG. 3D, the substrate 210 includes first and second monoliths 231, 232, which are physically separate monoliths. A first washcoat is coated onto the first monolith 231 and a second washcoat is coated onto the second monolith 232.

All of the embodiments of the present invention include a copper-ceria catalyst in one or more of the washcoats. The copper-ceria catalyst that is included is synthesized based on the procedure disclosed in Tang, et al., "CuO/CeO$_2$ Catalysts: Redox Features and Catalytic Behaviors," Applied Catalysis A: General, Vol. 288, pp. 116-125 (2005), which is incorporated by reference herein. The present invention, however, is not limited to copper-ceria catalyst synthesized in this manner, and may cover copper-ceria catalyst synthesized according to other methods known in the art.

The synthesis to produce 4% Cu supported on $CeO_2$ is as follows. First, mix 6 g of ceria into 50 ml de-ionized water. Then, add 0.786 g of $Cu(CH_3COO)_2$ into it, while keeping the reaction temperature at 70° C., and stir for 0.5 hours. Prepare 0.25 M of $Na_2CO_3$, gradually add to the mixture until pH is about 9. The resulting mixture is aged for 1 hour at a temperature of 44° C. After aging, the precipitate is filtered, washed with 300 mL of water, dried for about 5 hours at 140° C., and calcined for 2 hours at 500° C.

Steady state core tests were conducted to demonstrate the performance-enhancing benefits or cost-reduction benefits of using copper-ceria as part of an engine exhaust catalyst. The different configurations that were tested are shown in Table 1-3. Pt—Pd samples were synthesized according to methods disclosed in Example 11 of U.S. Patent Application Publication No. 2008/0119353, which is incorporated by reference herein, and have indicated weight ratios. Pd—Au samples were synthesized according to Example 1 of U.S. Pat. No. 7,709,407, which in incorporated by reference herein and have indicated weight ratios. Zeolites that were used include ZSM-5 zeolite and HY zeolite. Other types of zeolites that can be used which include beta zeolite, mordenite, ferrierite, etc. The zeolites can be mixtures in any weight ratio. In some embodiments, ceria ($CeO_2$) and alumina ($Al_2O_3$) are added as components. Example 1 is the comparative sample. Examples 1-5 employ three layers. Examples 6-10 employ two layers. Examples 11-13 employ only a single layer.

Example 1

Tri-layer: PtPd (at 62.2 g/ft$^3$) 1$^{st}$ layer, Zeolite mixture 2$^{nd}$ layer, PdAu (at 95.8 g/ft$^3$) 3$^{rd}$ layer The supported PtPd catalyst powder (3.0% Pt, 1.5% Pd) was prepared as follows. To 10 L of de-ionized $H_2O$ was added 1940 g of La-stabilized alumina (having a BET surface area of ~200 m$^2$ g$^{-1}$) followed by stirring for 30 minutes at room temperature. To this slurry was added 490.6 g of $Pt(NO_3)_2$ solution (12.23% $Pt(NO_3)_2$ by weight), followed by stirring at room temperature for 60 minutes. Acrylic acid (750 mL, 99% purity) was then added into the system over 12 minutes and the resulting mixture was allowed to continue stirring at room temperature for 2 hours. The solid La-doped alumina supported Pt catalyst was separated from the liquid via filtration, dried at 120° C. for 2 hours, ground into a fine powder, and calcined in air for 2 hours at a temperature of 500° C. (heated at 8° C. min$^{-1}$) to give a 3% Pt material.

To 9.25 L of de-ionized $H_2O$ was added 1822 g of the above 3% Pt material followed by stirring for 20 minutes at room temperature. To this slurry was added 194.4 g of $Pd(NO_3)_2$ solution (14.28% $Pd(NO_3)_2$ by weight), followed by stirring at room temperature for 60 minutes. An aqueous ascorbic acid solution (930 g in 4.5 L of de-ionized $H_2O$) was then added over 25 minutes followed by stirring for 60 minutes. The solid La-doped alumina supported PtPd catalyst was separated from the liquid via filtration, dried at 120° C. for 2 hours, ground into a fine powder, and calcined in air for 2 hours at a temperature of 500° C. (heated at 8° C. min$^{-1}$) to give a 3% Pt, 1.5% Pd material.

The resulting PtPd catalyst powder was made into a washcoat slurry via addition to de-ionized water, milling to an appropriate particle size (typically with $d_{50}$ range from 3 to 7 µm), and pH adjustment to give an appropriate viscosity for washcoating. The washcoat slurry was coated onto a round cordierite monolith, dried at 120° C. and calcined at 500° C. to give the first layer of the multi-layer coated monolith, such that the PtPd loading was ~62.2 g/ft$^3$.

Then Y zeolite and ZSM-5 zeolite, copper ceria were made into a washcoat slurry via addition to de-ionized water, milling to an appropriate particle size (typically with a $d_{50}$ range from 3 to 7 µm), and pH adjustment to give an appropriate viscosity for washcoating. The zeolite and copper ceria slurry were coated onto the cordierite monolith, dried at 120° C. and calcined at 500° C. to give the second layer of the multi-layer coated monolith.

Then supported PdAu catalyst powder (1.7% Pd, 2.0% Au) was prepared as follows. Add 3.853 g of alumina powder to 15 mL of de-ionized water and stir for 10 minutes. Add in 3.2 mL of 1 M NaOH to mixture and increase the temperature to 368 K. After the mixture reaches 368 K, dropwise add solutions containing 0.667 mL of 100 mg/mL Pd(NO$_3$)$_3$ in 2.5 mL of de-ionized water and 0.80 mL of 100 mg/mL HAuCl$_4$ in 2.5 mL of de-ionized water, to the mixture simultaneously. During this step, the pH of the mixture is maintained to be greater than 7.5 by adding additional 1 mL of 1 M NaOH to the mixture. Then, stir the mixture for 3 hours while keeping the mixture at 368 K. The mixture is then filtered and washed with de-ionized water at 323 K to separate out the supported catalyst. The supported catalyst is dried at 393 K for 3 hours, and ground to a fine powder using a mortar and pestle. The powder is calcined in air at 773 K for 2 hours using a heating ramp rate of 8 K/min.

The resulting PdAu catalyst powder was made into a washcoat slurry via addition to de-ionized water, milling to an appropriate particle size (typically with $d_{50}$ range from 3 to 7 µm), and pH adjustment to give an appropriate viscosity for washcoating. The washcoat slurry was coated onto a round cordierite monolith, dried at 120° C. and calcined at 500° C. to give the third layer of the multi-layer coated monolith, such that the PdAu loading was ~95.8 g/ft$^3$.

Example 2-5

Examples 2-5 represent various tri-layer configurations containing copper ceria. The samples in Examples were prepared using a procedure similar to Example 1. If a layer in a sample contains a combination of catalysts, then the catalysts for the layer were mixed before the milling step.

Example 6

Double-layer: zeolite mixture and PdAu (at 63.0 g/ft$^3$) 1$^{st}$ layer, Copper Ceria at the 2$^{nd}$ layer The supported PdAu catalyst powder (1.7% Pd, 2.0% Au) prepared as shown in Example 1 was made into a washcoat slurry via addition to de-ionized water, then add HY zeolite and ZSM-5 zeolite, milling to an appropriate particle size (typically with $d_{50}$ range from 3 to 7 µm), and pH adjustment to give an appropriate viscosity for washcoating. The washcoat slurry was coated onto a round cordierite monolith, dried at 120° C. and calcined at 500° C. to give the first layer of the multi-layer coated monolith, such that the PdAu loading was ~63.0 g/ft$^3$.

Copper Ceria catalyst powder prepared as described was made into a washcoat slurry via addition to de-ionized water, milling to an appropriate particle size (typically with $d_{50}$ range from 3 to 7 µm), and pH adjustment to give an appropriate viscosity for washcoating. The washcoat slurry was coated onto a round cordierite monolith, dried at 120° C. and calcined at 500° C. to give the second layer of the multi-layer coated monolith, such that the copper ceria loading was ~1.2 g/in$^3$.

Example 7-10

Examples 7-10 represent various double-layer configurations containing copper ceria. The samples in Examples were prepared using a procedure similar to Example 6. If a layer in a sample contains a combination of catalysts, then the catalysts for the layer were mixed before the milling step.

Example 11

Single-layer: zeolite mixture and PtPd (at 78 g/ft$^3$) and copper ceria in one layer The supported PtPd catalyst powder (3% Pt, 1.5% Pd) prepared as shown in Example 1 was made into a washcoat slurry via addition to de-ionized water, then add HY zeolite and ZSM-5 zeolite, copper ceria, milling to an appropriate particle size (typically with $d_{50}$ range from 3 to 7 µm), and pH adjustment to give an appropriate viscosity for washcoating. The washcoat slurry was coated onto a round cordierite monolith, dried at 120° C. and calcined at 500° C. to give the layer of the single-layer coated monolith, such that the PtPd loading was ~78.0 g/ft$^3$ and copper ceria was ~1.2 g/in$^3$.

Examples 12-15

Examples 12-15 represent various single-layer configurations containing copper ceria. The samples in Examples were prepared using a procedure similar to Example 11. If a layer in a sample contains a combination of catalysts, then the catalysts for the layer were mixed before the milling step.

For easy reference, the copper-ceria component is indicated in boldface. Also, the cost reduction (CR) relative to the cost of Example 1 is provided for all the examples. The cost calculations assume the cost basis for Pt:Pd:Au to be 5:1:2. The cost basis of Pd:Cu is assumed to be about 100:1. It is calculated with the formula:

(cost of example 1−cost of sample X)/cost of example 1.

T-50 numbers indicate the temperature that reactants reach 50% conversion. For instance: CO T-50 at 148° C. means that 50% CO has been converted at 148° C. Lower T-50 is normally desired for better conversion efficiency. All the test are in the condition of 1000 ppm CO, 105 ppm $C_3H_8$, 245 ppm $C_3H_6$, 120 ppm O-Xylene, 150 ppm NO, 10% $O_2$. Gas Hourly Space Velocity (GHSV) is 60,000 h$^{-1}$ unless indicated otherwise. During the run, the gas mixtures were flowed at 40° C. for 15 minutes and then their temperatures were increased from 40° C. to 250° C. at a rate of 5° C./min. Samples were aged in 10% $H_2O$ at 750° C. for 20 hours before testing. Grams per cubic inch ("g/in$^3$") units are used herein and in the claims to express the quantity of relatively plentiful components such as the copper ceria, ceria, alumina, zeolite catalytic materials, and grams per cubic foot ("g/ft$^3$") units are used to express the quantity of the sparingly-used ingredients, such as the Platinum, Palladium, Gold metals.

TABLE 1

Tri-layer configurations and performance

| | Top Layer | Middle Layer | Bottom Layer | CR % | Fresh CO T-50 (°C.) | Fresh Propene T-50 (°C.) | Aged CO T-50 (°C.) | Aged Propene T-50 (°C.) |
|---|---|---|---|---|---|---|---|---|
| Example 1 | Pt—Pd (3.0%, 1.5% by weight) at 62.2 g/ft$^3$ | HY Zeolite (0.2 g/in$^3$) ZSM-5 Zeolite (0.1 g/in$^3$) Ceria (0.2 g/in$^3$) | Pd—Au (1.7%, 2.0% by weight) at 95.8 g/ft$^3$ | 0 | 148 | 172 | 158 | 181 |
| Example 2 | Pt—Pd (3.0%, 1.5% by weight) at 62.2 g/ft$^3$ | HY Zeolite (0.15 g/in$^3$) ZSM-5 Zeolite (0.15 g/in$^3$) Copper Ceria (1.2 g/in$^3$) | Pd—Au (1.7%, 2.0% by weight) at 44.4 g/ft$^3$ | 21.7 | 155 | 177 | 158 | 184 |
| Example 3 | Pt—Pd (3.0%, 1.5% by weight) at 62.2 g/ft$^3$ | HY Zeolite (0.15 g/in$^3$) ZSM-5 Zeolite (0.15 g/in$^3$) Ceria (0.2 g/in$^3$) | Pd—Au (1.7%, 2.0% by weight) at 44.4 g/ft$^3$ Copper Ceria (1.2 g/in$^3$) | 21.7 | 167 | 192 | 158 | 193 |
| Example 4 | Pt—Pd (3.0%, 1.5% by weight) at 62.2 g/ft$^3$ Copper Ceria (1.2 g/in$^3$) | HY Zeolite (0.15 g/in$^3$) ZSM-5 Zeolite (0.15 g/in$^3$) Ceria (0.2 g/in$^3$) | Pd—Au (1.7%, 2.0% by weight) at 44.4 g/ft$^3$ | 21.7 | 157 | 182 | 154 | 185 |
| Example 5 | Pt—Pd (3.0%, 1.5% by weight) at 62.2 g/ft$^3$ | HY Zeolite (0.15 g/in$^3$) ZSM-5 Zeolite (0.15 g/in$^3$) Copper Ceria (0.2 g/in$^3$) | Pd—Au (1.7%, 2.0% by weight) at 95.8 g/ft$^3$ | 0 | 151 | 176 | 155 | 185 |

TABLE 2

Double-layer configurations and performance

| | Top Layer | Bottom Layer | CR % | Fresh CO T-50 (°C.) | Fresh Propene T-50 (°C.) | Aged CO T-50 (°C.) | Aged Propene T-50 (°C.) |
|---|---|---|---|---|---|---|---|
| Example 6 | HY Zeolite (0.15 g/in$^3$) ZSM-5 Zeolite (0.15 g/in$^3$) Pd—Au (1.7%, 2.0% by weight) at 63.0 g/ft$^3$ | Copper Ceria (1.2 g/in$^3$) | 73.9 | 164 | 210 | 162 | 213 |
| Example 7 | HY Zeolite (0.15 g/in$^3$) ZSM-5 Zeolite (0.15 g/in$^3$) Pt—Pd (3%, 1.5% by weight) at 60.0 g/ft$^3$ | Copper Ceria (1.2 g/in$^3$) | 41.6 | 141 | 171 | 152 | 186 |
| Example 8 | HY Zeolite (0.15 g/in$^3$) ZSM-5 Zeolite (0.15 g/in$^3$) Copper Ceria (1.2 g/in$^3$) Alumina (0.7 g/in$^3$) | Pd—Au (1.7%, 2.0% by weight) at 63.0 g/ft$^3$ | 73.9 | 167 | 214 | 177 | 209 |
| Example 9 | HY Zeolite (0.15 g/in$^3$) ZSM-5 Zeolite (0.15 g/in$^3$) Pt—Pd (2%, 2% by weight) at 78.0 g/ft$^3$ | Copper Ceria (1.2 g/in$^3$) | 37.7 | 148 | 170 | 181 | 202 |

TABLE 2-continued

Double-layer configurations and performance

|  | Top Layer | Bottom Layer | CR % | Fresh CO T-50 (° C.) | Fresh Propene T-50 (° C.) | Aged CO T-50 (° C.) | Aged Propene T-50 (° C.) |
|---|---|---|---|---|---|---|---|
| Example 10 | HY Zeolite (0.15 g/in$^3$) ZSM-5 Zeolite (0.15 g/in$^3$) Pt (3% by weight) at 57.0 g/ft$^3$ | Copper Ceria (1.2 g/in$^3$) | 24.2 | 136 | 168 | 172 | 212 |

TABLE 3

Single-layer configurations and performance

|  | Layer composition | CR % | Fresh CO T-50 (° C.) | Fresh Propene T-50 (° C.) | Aged CO T-50 (° C.) | Aged Propene T-50 (° C.) |
|---|---|---|---|---|---|---|
| Example 11 | HY Zeolite (0.15 g/in$^3$) ZSM-5 Zeolite (0.15 g/in$^3$) Pt—Pd (2%, 2% by weight) at 78.0 g/ft$^3$ Copper Ceria (1.2 g/in$^3$) | 37.7 | 157 | 181 | 167 | 191 |
| Example 12 | HY Zeolite (0.15 g/in$^3$) ZSM-5 Zeolite (0.15 g/in$^3$) Pt (3% by weight) at 57.0 g/ft$^3$ Copper Ceria (1.2 g/in$^3$) | 24.2 | 142 | 165 | 182 | 205 |
| Example 13 | HY Zeolite (0.15 g/in$^3$) ZSM-5 Zeolite (0.15 g/in$^3$) Pt (3% by weight) at 57.0 g/ft$^3$ | −37.9 | 155 | 180 | 210 | 230 |
| Example 14 | HY Zeolite (0.15 g/in$^3$) ZSM-5 Zeolite (0.15 g/in$^3$) Pt—Pd (3%, 1.5% by weight) at 120 g/ft$^3$ | −16.8 | 167 | 183 | 175 | 185 |
| Example 15 | Copper Ceria (1.2 g/in$^3$) | 99 | 150 | n/a | 155 | n/a |

The T50 temperatures presented in the tables above show the benefits of adding copper-ceria. In the three-layer configurations, the inventors have discovered that Example 2, which has copper-ceria in the middle layer, exhibits comparable performance to Example 1, even though Example 2 uses lesser amount of Pd—Au catalyst in the bottom layer. The performance of Example 2 is expected to improve even more if the same amount of Pd—Au catalyst is used in the bottom layer as in Example 1. Thus, the benefits of using Example 2 are reduction of about 20% in cost for the same performance or improvement in performance for the same cost. In addition, T50 temperatures presented in the tables above show that the performances of Examples 2, 6, and 10 do not degrade significantly upon aging. This shows that the copper-ceria introduced in these example catalysts are stable under our conditions.

In general, the inventors have discovered through the application of copper-ceria in engine exhaust treatment systems that copper-ceria is a good low temperature CO oxidation catalyst that generates exothermic heat during catalysis and reduces HC and $NO_x$ emissions especially during cold start. In addition, copper-ceria adds little cost to the whole system, and is stable under our aging conditions.

The weight loading of copper in the embodiments of the present invention is 0.1% to 10%, preferably 1% to 5%. Support metal oxides in the embodiments of the present invention include functioning metal oxides, such as $CeO_2$, $CeZrO_x$, $TiO_2$, and the like. Washcoat loading of copper-ceria in the embodiments of the present invention is greater than 0.2 g/in$^3$, preferably 0.4 g/in$^3$ to 2.0 g/in$^3$, more preferably 0.7 g/in$^3$ to 1.7 g/in$^3$. The total weight loading of platinum-palladium in the embodiments of the present invention is 0.5% to 10%, preferably 0.5% to 6%. Washcoat loading of platinum-palladium in the embodiments of the present invention is greater than 0.2 g/in$^3$, preferably 0.2 g/in$^3$ to 2 g/in$^3$, more preferably 0.5 g/in$^3$ to 1.5 g/in$^3$. The total weight loading of palladium in the embodiments of the present invention is 0.2% to 10%, preferably 0.5% to 6%. Washcoat loading of palladium-gold in the embodiments of the present invention is greater than 0.2 g/in$^3$, preferably 0.2 g/in$^3$ to 2 g/in$^3$, more preferably 0.5 g/in$^3$ to 1.5 g/in$^3$.

In one embodiment, the engine exhaust catalyst may include three washcoat layers disposed on a substrate. Each layer may include one or more metals of copper ceria, platinum based catalysts, and palladium based catalysts. For example, the first layer may include a platinum based catalyst such as platinum-palladium, platinum bismuth, platinum, and combinations thereof. The weight ratio of the platinum to palladium may be from 4:1 to 1:4, preferably, from 3:1 to 1:2. The second layer may include copper-ceria. The third layer may include a palladium based catalyst such as palladium-gold, palladium, and combinations thereof. The weight ratio of the palladium to gold may be from 3:1 to 1:3, preferably, from 2:1 to 1:2. These layers may be arranged in any order relative to the substrate. For example, the palladium based layer is in direct contact with the substrate, while the copper ceria layer is disposed between the platinum based layer and the palladium based layer. In an exemplary embodiment, the washcoat loading of the copper-ceria is higher than the washcoat loading of the platinum based layer or the palladium based layer. In another example, at least two of the catalysts may be disposed on the same layer. The copper ceria may be combined with the palladium based catalyst or the platinum-based catalyst, or the palladium-based catalyst may be combined with the platinum-based catalyst. In yet another example, the same metal may be included on more than one layer.

In another embodiment, the engine exhaust catalyst may include two washcoat layers disposed on a substrate. The first layer may include a platinum based catalyst such as platinum-palladium, platinum bismuth, platinum, and combinations thereof, and/or a palladium based catalyst such as palladium-gold or palladium, and combinations thereof. The weight ratio of the platinum to palladium may be from 4:1 to 1:4, preferably, from 3:1 to 1:2. The weight ratio of the palladium to gold may be from 3:1 to 1:3, preferably, from 2:1 to 1:2. The second layer may include copper-ceria. These layers may be arranged in any order relative to the substrate. For example, the platinum based layer is in direct contact with the substrate, while the copper ceria layer is disposed exterior to the platinum based layer. In an exemplary embodiment, the washcoat loading of the copper-ceria is higher than the washcoat loading of the platinum based catalyst or the palladium based catalyst. In yet another example, the same metal may be included on more than one layer. For example, any one of the metal catalyst such as copper ceria may on both layers. In another example, copper ceria may be combined with the palladium based catalyst or the platinum-based catalyst.

In another embodiment, the engine exhaust catalyst may include a washcoat layer containing copper-ceria disposed on a substrate. The washcoat layer may additionally include a platinum based catalyst such as a platinum-palladium catalyst; and/or platinum bismuth or platinum, a palladium based catalyst such as palladium-gold or palladium, and combinations thereof. The weight ratio of the platinum to palladium may be from 4:1 to 1:4, preferably, from 3:1 to 1:2. The weight ratio of the palladium to gold may be from 3:1 to 1:3, preferably, from 2:1 to 1:2. In an exemplary embodiment, the washcoat loading of the copper-ceria is higher than the washcoat loading of the platinum based catalyst or the palladium based catalyst.

In the embodiments described herein, the engine exhaust catalyst may optionally include one or more zeolites such as ZSM5 zeolite, HY zeolite, beta zeolite, mordenite, ferrierite, and combinations thereof. In some embodiments, ceria (CeO$_2$) and alumina (Al$_2$O$_3$) may be added as components. The zeolites and other components may be included in one or more of the washcoat layers.

Embodiments of the present invention include providing the copper ceria in one or more zones of the substrate. Therefore, the description herein with respect to washcoat layers applies equally to providing metal particles such copper ceria zones. In one embodiment, instead of the coating the monolith with the supported catalysts in washcoat layers, the catalysts may be coated on the monolith using two or more coating zones, as shown in FIGS. 3C and 3D. For example, instead of three layers, the monolith may be coated with three zones of catalysts. In yet another embodiment, the monolith may be coated with a combination of zones and layers of different catalyst formulations. If desired, the zones and/or layers may overlap to provide even more flexibility for the catalyst design.

In an exemplary embodiment of coating a monolith in zones, the zone of the monolith to be coated is partially immersed in the coating liquid which fills the dip pan. The liquid is raised up to the desired coating profile level through a combined effect of capillary forces and vacuum applied to the top face of the zone. The amount of coating liquid per zone is controlled through the depth of immersion. The monolith is immersed into the coating media to a depth L (about 6-12 mm), that ensures a suitable volume of the liquid above the immersed end of the substrate. A complete two-zone coating process is performed by coating of one end followed by drying and then coating of the other end followed by drying and calcination.

In another embodiment, an engine exhaust catalyst includes a first washcoat layer having a platinum-based catalyst; a second washcoat layer; a third washcoat layer includes a palladium-gold catalyst; and a copper ceria catalyst in at least one of the first, second, and third layers.

In one or more of the embodiments described herein, the copper ceria is in the second washcoat layer.

In one or more of the embodiments described herein, the catalyst further includes a substrate, wherein the third washcoat layer directly contacts the substrate and the second washcoat layer is disposed between the first and third washcoat layers.

In one or more of the embodiments described herein, the first washcoat layer encounters an engine exhaust flow before the second and third washcoat layers.

In one or more of the embodiments described herein, the second washcoat layer further includes zeolites.

In one or more of the embodiments described herein, the platinum-based catalyst is a platinum-palladium catalyst, a platinum-bismuth catalyst, or combinations thereof.

In one or more of the embodiments described herein, the weight loading of copper in the copper-ceria is 1% to 10%.

In one or more of the embodiments described herein, the weight loading of the copper-ceria in the second washcoat layer is 0.2 g/in$^3$ to 2.0 g/in$^3$.

In one or more of the embodiments described herein, the copper ceria is included in another washcoat layer.

In one or more of the embodiments described herein, the third washcoat layer is above the first and second washcoat layers.

In one or more of the embodiments described herein, the second washcoat layer is above the first and third washcoat layers.

In another embodiment, an engine exhaust catalyst includes a first washcoat layer having at least one of a platinum-based catalyst, a palladium-based catalyst, and combinations thereof; and a second washcoat layer having copper-ceria.

In one or more of the embodiments described herein, the second washcoat layer is above the first washcoat layer.

In one or more of the embodiments described herein, the second washcoat layer includes one or more zeolites.

In one or more of the embodiments described herein, the catalyst includes a substrate, wherein the second washcoat layer directly contacts the substrate.

In one or more of the embodiments described herein, the first washcoat layer encounters an engine exhaust flow before the second washcoat layer.

In one or more of the embodiments described herein, the first washcoat layer further includes zeolites.

In one or more of the embodiments described herein, the palladium-based catalyst is a palladium-gold catalyst.

In one or more of the embodiments described herein, the second layer further includes one a platinum-based catalyst, a palladium-based catalyst, and combinations thereof.

In one or more of the embodiments described herein, the platinum-based catalyst comprises platinum-bismuth.

In one or more of the embodiments described herein, the weight loading of copper in the copper-ceria is 1% to 10%.

In one or more of the embodiments described herein, the weight loading of the copper-ceria in the second washcoat layer is 0.2 g/in$^3$ to 2.0 g/in$^3$.

In one or more of the embodiments described herein, the catalyst includes a third washcoat layer.

In another embodiment, an engine exhaust catalyst includes a copper ceria; a platinum-based catalyst, a palladium-based catalyst, and combinations thereof; and a zeolite.

In one or more of the embodiments described herein, the zeolites include HY zeolites and ZSM5 zeolites.

In one or more of the embodiments described herein, the weight loadings of the platinum-based catalyst and the copper-ceria are approximately the same.

In one or more of the embodiments described herein, wherein the platinum-based catalyst is a platinum-palladium catalyst.

In one or more of the embodiments described herein, the weight loading of copper in the copper-ceria is 1% to 10%.

In one or more of the embodiments described herein, wherein the weight loading of the copper-ceria is 0.2 g/in$^3$ to 2.0 g/in$^3$.

In another embodiment, an engine exhaust catalyst includes a first zone having a platinum-based catalyst; a second zone; a third zone having a palladium-gold catalyst; and a copper ceria catalyst in at least one of the first, second, and third zones. In yet another embodiment, the engine exhaust catalyst further includes one or more washcoat layers having a metal catalyst.

In another embodiment, an engine exhaust catalyst includes a first zone having at least one of a platinum-based catalyst, a palladium-based catalyst, and combinations thereof; and a second zone having copper-ceria. In yet another embodiment, the engine exhaust catalyst further includes one or more washcoat layers having a metal catalyst. In still yet another embodiment, the engine exhaust catalyst further includes a washcoat layer having copper ceria.

In one or more of the embodiments described herein, the catalyst includes a substrate, and the second zone is in front of the first zone.

In one or more of the embodiments described herein, one or more zeolites is provided in at least one of the first zone and the second zone.

In one or more of the embodiments described herein, the first zone encounters an engine exhaust flow before the second zone.

In one or more of the embodiments described herein, the palladium-based catalyst is a palladium-gold catalyst.

In one or more of the embodiments described herein, the second layer further includes one a platinum-based catalyst, a palladium-based catalyst, and combinations thereof.

In one or more of the embodiments described herein, the platinum-based catalyst is one of platinum-palladium, platinum-bismuth, and combinations thereof.

In one or more of the embodiments described herein, the weight loading of copper in the copper-ceria is 1% to 10%.

In one or more of the embodiments described herein, the weight loading of the copper-ceria in the second zone is 0.2 g/in$^3$ to 2.0 g/in$^3$.

In one or more of the embodiments described herein, the catalyst includes a third zone.

In one or more of the embodiments described herein, the first zone includes a plurality of washcoat layers. In another embodiment, the first zone includes at least two layers and at least one of the washcoat layers includes copper ceria. In yet another embodiment, the second zone includes a plurality of washcoat layers.

In one or more of the embodiments described herein, the second zone includes two washcoat layers. In another embodiment, the second zone includes a first washcoat layer having at least one of a platinum-based catalyst, a palladium-based catalyst, and combinations thereof; and a second washcoat layer having copper-ceria.

While particular embodiments according to the invention have been illustrated and described above, those skilled in the art understand that the invention can take a variety of forms and embodiments within the scope of the appended claims.

What is claimed is:

1. An engine exhaust catalyst comprising:
   a first washcoat layer including a platinum-based catalyst;
   a second washcoat layer;
   a third washcoat layer including a palladium-gold catalyst; and
   a copper-ceria catalyst included in at least one of the first, second, and third layers, wherein a weight loading of copper in the copper-ceria is 1% to 10%, and wherein a weight loading of the copper-ceria included in the at least one of the first, second, and third layers is 0.2 g/in$^3$ to 2.0 g/in$^3$.

2. The engine exhaust catalyst according to claim 1, wherein the copper-ceria catalyst is in the second washcoat layer.

3. The engine exhaust catalyst according to claim 2, further comprising a substrate, wherein the third washcoat layer directly contacts the substrate and the second washcoat layer is disposed between the first and third washcoat layers.

4. The engine exhaust catalyst according to claim 2, wherein the first washcoat layer encounters an engine exhaust flow before the second and third washcoat layers.

5. The engine exhaust catalyst according to claim 2, wherein the second washcoat layer further includes zeolites.

6. The engine exhaust catalyst according to claim 5, wherein the platinum-based catalyst is a platinum-palladium catalyst.

7. The engine exhaust catalyst according to claim 6, wherein the weight loading of the copper-ceria catalyst in the second washcoat layer is 0.2 g/in$^3$ to 2.0 g/in$^3$.

8. The engine exhaust catalyst according to claim 6, wherein a total weight loading of platinum-palladium is 0.5% to 6%.

9. The engine exhaust catalyst according to claim 6, wherein a weight loading of platinum-palladium in the first washcoat layer is 0.2 g/in$^3$ to 2 g/in$^3$.

10. The engine exhaust catalyst according to claim 2, wherein the copper-ceria catalyst is included in another washcoat layer.

11. The engine exhaust catalyst according to claim 1, wherein the weight loading of copper-ceria is 0.7 g/in$^3$ to 1.7 g/in$^3$.

12. The engine exhaust catalyst according to claim 1, wherein a total weight loading of palladium in the catalyst is 0.5% to 6%.

13. The engine exhaust catalyst according to claim 1, wherein a weight loading of palladium-gold in the third washcoat layer is 0.2 g/in$^3$ to 2 g/in$^3$.

14. An engine exhaust catalyst comprising:
 a first washcoat layer including at least one of a platinum-based catalyst, a palladium-based catalyst, and combinations thereof; and
 a second washcoat layer including copper-ceria, wherein the weight loading of the copper-ceria in the second washcoat layer is 0.2 g/in$^3$ to 2.0 g/in$^3$.

15. The engine exhaust catalyst according to claim 14, further comprising a substrate, wherein the second washcoat layer directly contacts the substrate and the first washcoat layer is disposed on top of the second washcoat layer.

16. The engine exhaust catalyst according to claim 15, wherein the first washcoat layer encounters an engine exhaust flow before the second washcoat layer.

17. The engine exhaust catalyst according to claim 15, wherein the first washcoat layer includes a platinum-palladium catalyst having a weight loading of 0.2 g/in$^3$ to 2 g/in$^3$.

18. The engine exhaust catalyst according to claim 15, wherein the first washcoat layer includes a palladium-gold catalyst having a weight loading of 0.2 g/in$^3$ to 2 g/in$^3$.

19. The engine exhaust catalyst according to claim 14, wherein the first washcoat layer further includes zeolites.

20. The engine exhaust catalyst according to claim 14, wherein the second layer further includes one of a platinum-based catalyst, a palladium-based catalyst, and combinations thereof.

21. The engine exhaust catalyst according to claim 14, wherein the weight loading of copper in the copper-ceria is 1% to 10%.

22. The engine exhaust catalyst according to claim 14, further comprising a third washcoat layer.

23. The engine exhaust catalyst according to claim 14, wherein the second washcoat layer is above or in front of the first washcoat layer.

24. The engine exhaust catalyst according to claim 23, wherein the second washcoat layer includes one or more zeolite.

25. The engine exhaust catalyst according to claim 24, wherein the first washcoat layer includes copper-ceria.

26. An engine exhaust catalyst comprising:
 a copper-ceria component;
 a metal component selected from the group consisting of a platinum-based catalyst, a palladium-based catalyst, and combination thereof; and
 a zeolite component, wherein a weight loading of copper in the copper-ceria component is 1% to 10%, and
 wherein a weight loading of the copper-ceria component is 0.2 g/in$^3$ to 2.0 g/in$^3$ and wherein the weight loading of the copper-ceria component is higher than a weight loading of the metal component.

27. The engine exhaust catalyst according to claim 26, wherein the zeolite component includes HY zeolites and ZSM5 zeolites.

28. The engine exhaust catalyst according to claim 26, wherein the weight loadings of the platinum-based catalyst and the copper-ceria component are approximately the same.

29. The engine exhaust catalyst according to claim 26, wherein the platinum-based catalyst is one of a platinum-palladium catalyst, a platinum-bismuth, and combination thereof.

30. An engine exhaust catalyst comprising:
 a first zone including at least one of a platinum-based catalyst, a palladium-based catalyst, and combination thereof; and
 a second zone including copper-ceria, wherein a weight loading of copper in the copper-ceria is 1% to 10%, and wherein a weight loading of the copper-ceria included in the at least one of the first, second, and third layers is 0.2 g/in$^3$ to 2.0 g/in$^3$.

* * * * *